H. PAKEMAN.
SUCTION FLYCATCHER.
APPLICATION FILED DEC. 17, 1918.

1,313,203.

Patented Aug. 12, 1919.
2 SHEETS—SHEET 1.

WITNESSES.
George G. Myers.

INVENTOR
HARRY PAKEMAN,
BY
ATTORNEYS

H. PAKEMAN.
SUCTION FLYCATCHER.
APPLICATION FILED DEC. 17, 1918.
1,313,203.
Patented Aug. 12, 1919.
2 SHEETS—SHEET 2.
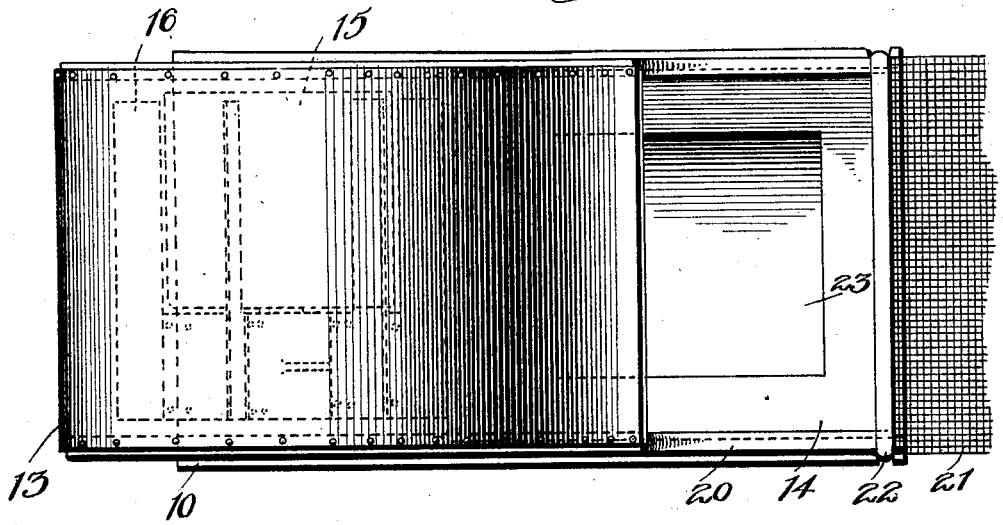
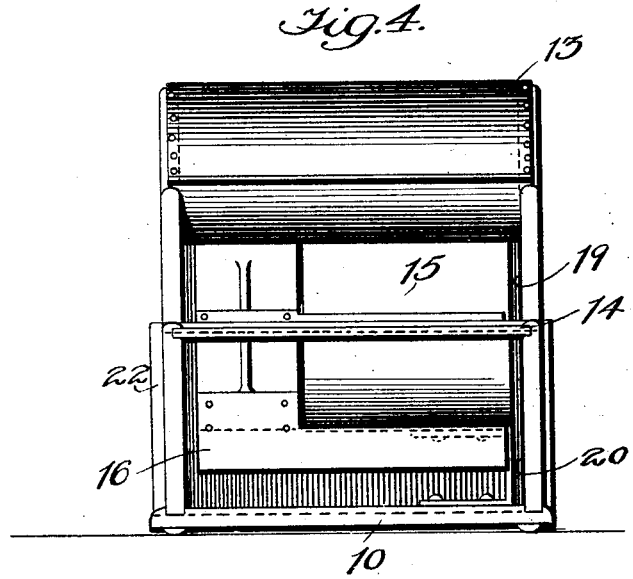
WITNESSES
INVENTOR
HARRY PAKEMAN,
BY
ATTORNEYS

UNITED STATES PATENT OFFICE.

HARRY PAKEMAN, OF NILES, OHIO.

SUCTION FLY-CATCHER.

1,313,203.   Specification of Letters Patent.   Patented Aug. 12, 1919.

Application filed December 17, 1918. Serial No. 267,127.

*To all whom it may concern:*

Be it known that I, HARRY PAKEMAN, a subject of the King of England, and a resident of Niles, county of Trumbull, and State of Ohio, have invented certain new and useful Improvements in Suction Fly-Catchers, of which the following is a specification.

My present invention relates generally to an electric fly catcher, and more particularly to a fly catcher in which an air current induced by an electrically operated fan causes the entrapment of flies in such manner as to provide for their ready destruction from time to time.

More particularly my present improvements relate to a small simple, and readily mobile device which includes a casing having a division plate between the intake and outlet channels, a portion of which partition is exposed adjacent the mouth of the intake channel and is provided with any suitable bait holding means for the attraction of the flies in the first instance.

In the accompanying drawings, illustrating my present invention and forming a part of the specification, Figure 1 is a perspective view illustrating the practical application of my invention;

Fig. 3 is a top plan view thereof, and

Fig. 4 is a front elevation, with the bag or trap removed.

Figure 1:
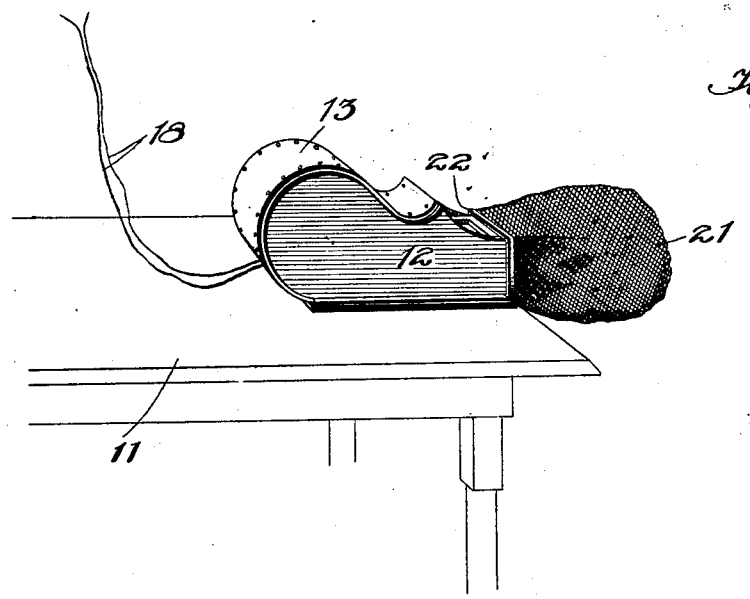

Referring now to these figures, my invention contemplates the use of a casing consisting of a flat oblong base 10 adapted to rest upon any flat suitable surface as for instance as seen at 11 in Fig. 1. The casing also includes side walls 12 and a continuous rear and top wall 13, the latter of which terminates at a point intermediate the front and rear ends of the side walls 12, as seen in Figs. 2 and 3 in particular, the space in advance of the forward edge of the wall being open between the upper forward portions of the side walls 12 above a horizontal division plate 14.

The partition or division wall or plate 14 just above mentioned, extends horizontally between the side walls 12 and rearwardly from the front edges of the side walls at a point below the forward portion of the top wall 13, the space between the plate 14 and the top wall 13 forming an intake channel and the space between plate 14 and the base 10 of the casing forming an outlet channel, as will be presently described.

Figure 2:
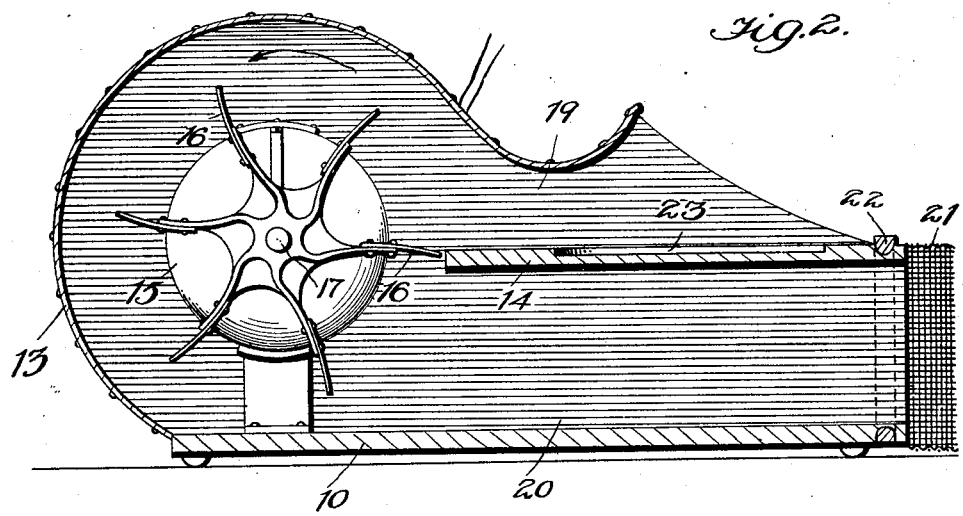
Fig. 2 is a vertical longitudinal section therethrough.

Across the rear portion, and within the casing thus formed, a transverse shaft 17 is journaled, having thereon a fan 16 and also provided with a motor 15 which may be provided with the necessary current from the ordinary house circuit through a supply cord 18, and rotation of which causes rotation of the fan 16 in the direction of the arrow in Fig. 2, so as to draw air inwardly through the upper intake channel 19 and exhaust the same through the lower outlet channel 20.

The base 10, side walls 12, and division plate 14 may have any suitable means along their vertical front edges for the attachment of a bag or trap 21, formed either of wire mesh, or a suitable fabric, and such attaching devices may be in the nature of grooves to be engaged by an elastic member 22 to which the bag or trap 21 may in turn be secured. It is obvious that this provides for ready removal of the bag or trap in order that the entrapped insects may be destroyed and discharged therefrom.

The division plate 14 is also provided in its exposed upper forward surface with any suitable bait holding means, as for instance a depression or cut out portion 23, in which molasses, honey, or other similar fly bait may be disposed to attract the insects in the first instance. In the operation with the motor and fan rotating properly, it is obvious that the insects so attracted to the bait upon the plate 14, will thus be brought into the influence of the intake air channel 19, the rush of air inwardly through which, induced by the fan, will draw the insects inwardly along the same and will effect their discharge through the outlet channel 20 into the bag or trap 21.

It is furthermore obvious that by the construction described, I am enabled to produce a simple, inexpensive readily portable trap of this nature and that the use of a horizontal division plate 14 admits of the creation of two air channels in one of which air is taken inwardly and the other of which the air is expelled by virtue of the disposition of the fan with its axis approximately in the plane of the division plate.

I claim:

1. A fly trap of the character described comprising a casing open at one end, a fan housed within the casing adjacent its opposite end and rotating on a horizontal axis, means for rotating the fan, a partition plate disposed horizontally in the casing forwardly of the fan, and dividing the casing into upper and lower channels, respectively for the intake and exhaust of air currents induced by the fan, the upper forward portion of the said division plate being exposed for the support of a fly bait, and means adjacent the forward end of the casing to receive the flies expelled with the air through the outlet channel.

2. A fly trap of the character described comprising a casing open at one end, a fan housed within the casing adjacent its opposite end, means for rotating the fan, a horizontal division plate disposed within the casing in spaced relation to the top and base of the casing forwardly of the fan, said plate having the forward portion of its upper surface exposed and provided with bait holding means, a bag for receiving flies, and means for attaching the bag to the forward portion of the casing to cover the space below the division plate.

3. A fly trap of the character described comprising a casing open at its forward end, a fan housed within the casing adjacent its opposite end, a division wall extending horizontally in the casing forwardly of the fan and in spaced relation to the top and base of the casing so as to form air intake and outlet channels, said division plate having its upper forward surface exposed at the forward portion of the casing and provided with a bait holding depression, and a fly receiving receptacle detachably connected with the forward end of the casing around the outlet of the channel.

HARRY PAKEMAN.